United States Patent
Iwashita et al.

(10) Patent No.: US 6,563,283 B2
(45) Date of Patent: May 13, 2003

(54) MOTOR CONTROL DEVICE

(75) Inventors: Yasusuke Iwashita, Yamanashi (JP);
Hiroyuki Kawamura, Yamanashi (JP)

(73) Assignee: Fanuc Ltd., Yamanshi (JP)

( * ) Notice: Subject to any disclaimer, the term of this patent is extended or adjusted under 35 U.S.C. 154(b) by 3 days.

(21) Appl. No.: 09/819,985

(22) Filed: Mar. 29, 2001

(65) Prior Publication Data

US 2001/0026137 A1 Oct. 4, 2001

(30) Foreign Application Priority Data

Mar. 29, 2000 (JP) ............................. 2000-091404

(51) Int. Cl.[7] ................................................ G05B 11/28
(52) U.S. Cl. ...................... 318/599; 318/600; 318/592; 318/595
(58) Field of Search .................. 318/569, 594, 318/599, 600, 601, 603, 604, 432, 433, 811, 568.19, 592, 595; 388/915, 916

(56) References Cited

U.S. PATENT DOCUMENTS

| 3,577,057 | A | * | 5/1971 | Dyer et al. | |
| 3,819,992 | A | * | 6/1974 | Opal et al. | |
| 4,273,482 | A | * | 6/1981 | LLoyd et al. | 318/571 |
| 4,312,030 | A | * | 1/1982 | Byers | 318/811 X |
| 4,904,152 | A | * | 2/1990 | Doi et al. | 318/594 X |
| 4,924,168 | A | * | 5/1990 | Horie et al. | 318/811 |
| 4,959,598 | A | * | 9/1990 | Yoshida et al. | 318/599 |
| 4,959,797 | A | * | 9/1990 | McIntosh | 318/432 X |
| 5,068,777 | A | | 11/1991 | Ito | 367/97 |
| 5,196,778 | A | | 3/1993 | Hayashida | 318/807 |
| 5,721,475 | A | * | 2/1998 | Fincher | 318/599 |
| 5,744,927 | A | | 4/1998 | Hayashida | 318/599 |
| 5,880,574 | A | | 3/1999 | Otsuka et al. | 318/811 |
| 6,166,514 | A | * | 12/2000 | Ando et al. | 318/811 |

FOREIGN PATENT DOCUMENTS

| JP | 2-303390 | 12/1990 |
| JP | 4-156297 | 5/1992 |
| JP | 7-231666 | 8/1995 |

* cited by examiner

*Primary Examiner*—Bentsu Ro
(74) *Attorney, Agent, or Firm*—Staas & Halsey LLP

(57) ABSTRACT

Where high control precision is required in contour control or the like, mode B for a short PWM period is selected to assure a high control precision. Where high torque is required in fast feed, high acceleration or deceleration, mode A for long PWM period is selected so as to decrease the rate of the time of dead zone δ where voltage is not applied to the motor.

10 Claims, 4 Drawing Sheets

MOTOR CONTROL DEVICE

BACKGROUND OF THE INVENTION

1. Field of the Invention

The present invention relates to a motor control device for driving an AC motor used in a feed shaft or a spindle of various industrial machines such as machine tool, robot arm, injection molding machine, electric discharge machine, and motor-driven press.

2. Description of the Prior Art

Control methods for driving AC motors such as AC servo motor include PWM (pulse width modulation) method, variable frequency method, amplitude modulation method, etc.

In the PWM method, a switching element of a three-phase inverter is controlled to be turned on and off by a PWM signal generated by the PWM method, and a voltage from a direct-current power source is applied to each phase of the motor to drive and control the motor. FIG. 1 shows a part (for one phase) of a three-phase inverter, and this three-phase inverter has a combination of transistors T1 and T2 for each phase as a switching element.

FIG. 2 is an explanatory diagram of dead zone in PWM control for turning on and off the transistors of the inverter. A PWM command (voltage command) issued from current control loop or the like and a triangular wave (or sawtooth wave) are compared with each other. When the triangular wave is higher than the PWM command, a PWM signal is generated such that the transistor T1 is on while the transistor T2 is off. On the other hand, when the triangular wave is lower than the PWM command, the transistor T1 is off while the transistor T2 is on.

However, if the combined transistors T1 and T2 are simultaneously turned on, then the control power source E is short-circuited and an excessive current may flow. To avoid such phenomenon, for both transistors T1 and T2, simultaneous OFF time is provided as a dead zone δ when on/off changeover is performed.

The time width of the dead zone δ is determined based on the switching speed of the transistor serving as a switching element, and it is usually about several microseconds. The dead zone δ is provided by shortening the ON time of the transistors T1, T2. Further, upon every on/off of the PWM signal of rectangular wave for turning on and off the transistors T1, T2, a dead zone δ of specific width is provided.

Accordingly, when the on/off period of PWM signal becomes shorter, that is, when the period of the triangular wave (PWM period) becomes shorter, the number of times the dead zone δ is provided within a specific time increases, and the duration of non-application time of voltage to the motor is increased (note that voltage is applied to the motor when one of the transistors T1 and T2 is on and the other is off).

When the motor accelerates or decelerates steeply, the duration of one of the transistors being off and the other being on becomes longer. However, as a dead zone δ exists, ON time becomes shorter by the time width of this dead zone δ, and voltage is not applied to the motor for the time corresponding to the dead zone, thereby undesirably decreasing the output torque of the motor during a steep acceleration or deceleration.

Generally, as current control period becomes shorter, PWM period (period of triangular wave) becomes shorter, too. If the period becomes shorter, error can be detected and corrected quickly, and improvement of control precision (operation precision, machining precision, moving track precision, etc.) is realized. However, as the number of times of PWM period within a specific time increases, the number of times of appearance of dead zone also increases, which results in a decline of torque.

OBJECTS AND SUMMARY OF THE INVENTION

It is an object of the invention to provide a motor control device capable of solving the problem of decline of output torque of motor due to effects of duration of dead zone in which voltage is not applied to the motor in PWM control.

In the invention, taking into consideration decline of output torque of motor due to effects of duration of dead zone in which voltage is not applied to the motor in PWM control, PWM period is changed depending on whether a high torque is required or a high control precision is required, and torque decline is prevented when high torque is required, while the control precision is enhanced rather than higher torque when the control precision is required.

The principle of the invention is explained by referring to FIG. 3. Usually, in order to improve the control precision (operation precision, machining precision, moving track precision, etc.), the operation is set in mode B in which the current control period and PWM period are shorter. As the period is shorter, the control precision is enhanced. On the other hand, when a high torque is required, in high acceleration or deceleration, for example, the operation is set in mode A where both current control period and PWM period are longer, or at least the PWM period is longer. Accordingly, the rate of the time of dead zone δ within a specified time is decreased. As a result, decrease of generated torque due to dead zone δ can be suppressed optimally.

In the present invention, in the numerical controller of the motor control device, PWM period change instructing means for instructing change of PWM period is provided. Further, in the servo controller of the motor control device, PWM period changing means for changing the PWM period corresponding to the PWM period changing command is provided. Accordingly, to cope with a case whether a high control precision is required or a high torque is required, a command is issued from the numerical controller, and the motor is controlled by changing over to mode B or mode A.

The PWM period change instructing means issues a command for changing a PWM period, such as mode B or mode A, according to the type of a move command issued from the numerical controller, or according to operation precision, operating speed or degree of speed change instructed by the move command.

Moreover, PWM period is created by triangular waves, and the PWM period changing means changes the PWM period by changing the frequency of the triangular wave. Still more, the PWM period changing means also changes over, together with change of PWM period, current loop gain, speed loop gain and/or position loop gain in the servo controller.

BRIEF DESCRIPTION OF THE DRAWINGS

The foregoing and other objects and features of the invention will become apparent from the following description of a preferred embodiments of the invention with reference to the accompanying drawings, in which.

DETAILED DESCRIPTION OF THE PREFERRED EMBODIMENTS

Figure 1:
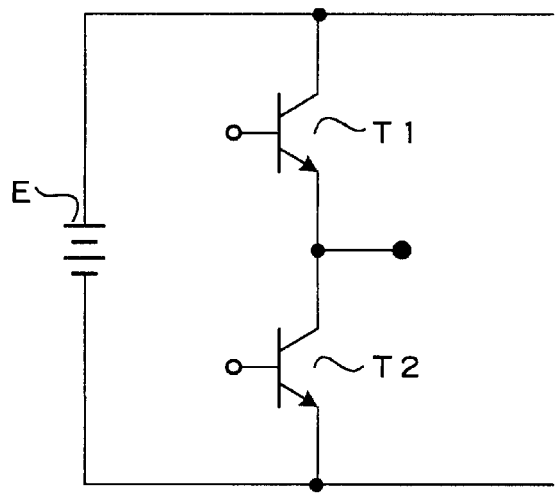
FIG. 1 is a diagram showing a part of an inverter.
Figure 2:
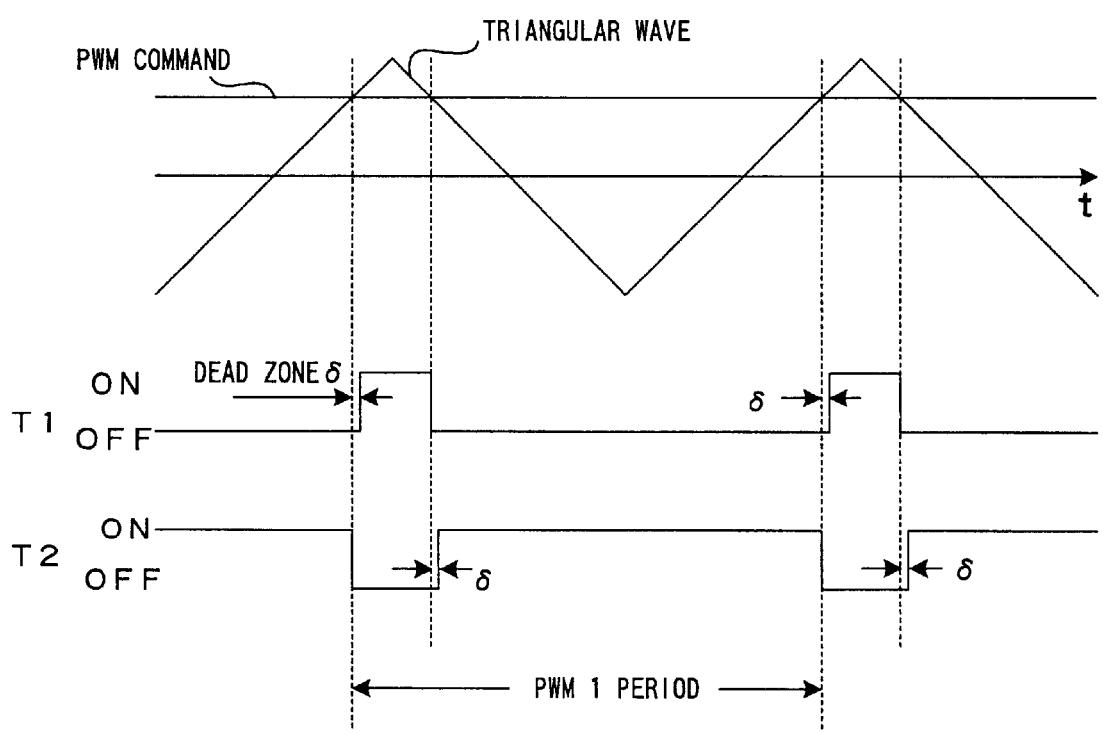
FIG. 2 is an explanatory diagram of duration of dead zone in which voltage is not applied to the motor in PWM control.
Figure 3:
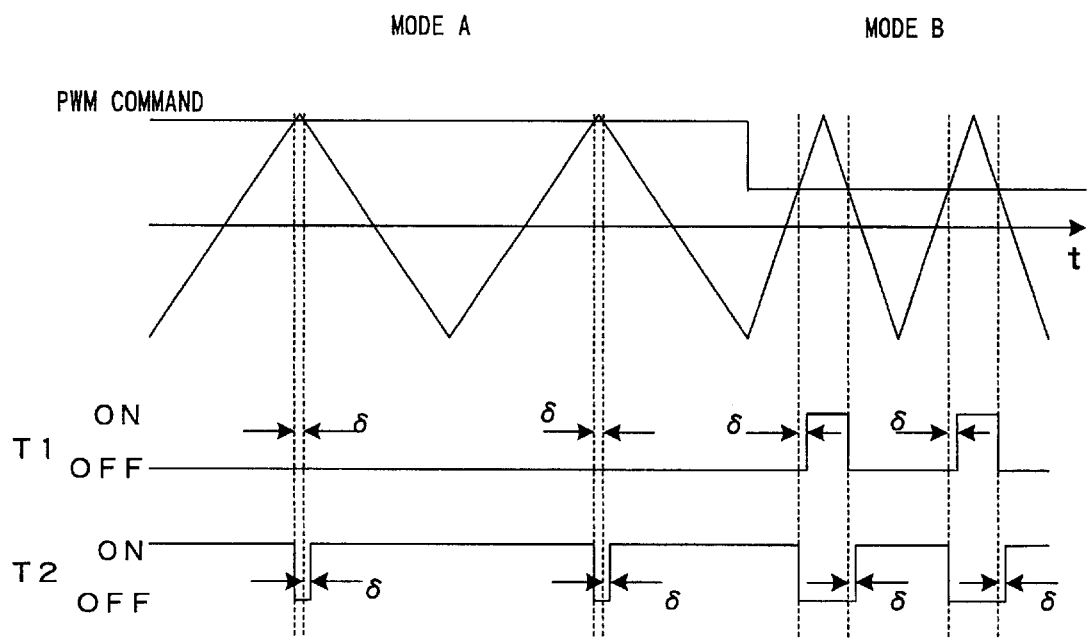
FIG. 3 is an explanatory diagram of the principle of the invention.
Figure 4:
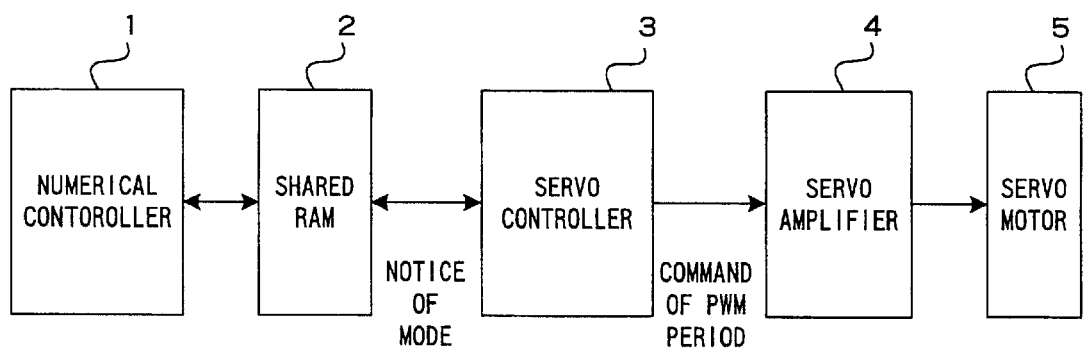
FIG. 4 is a block diagram of a motor control device in an embodiment of the invention.

FIG. 4 is a block diagram of a motor control device of various industrial machines having an AC servo motor as a motor for driving a feed shaft or a spindle, for example, machine tool, robot, injection molding machine, electric discharge machine, and motor-driven press. The motor control device according to one embodiment of the invention is almost same as a conventional motor control device in configuration as far as shown in this block diagram.

A numerical controller 1 writes, according to the program or the like, move command and various information for a servo motor 5 for driving individual axes of the machine, to a shared RAM 2, and transfers them to the processor of a servo controller 3. On the other hand, the processor of the servo controller 3 reads the move command and various information from the numerical controller 1, which are written in the shared RAM 2, and writes the information which are to be transferred to the numerical controller 1 to the shared RAM.

The servo controller 3 comprises a processor, ROM, RAM, interface, and others, and performs position control speed control and current control. This servo controller 3 receives the position/speed feedback signal from a position/speed detector (not shown) mounted on the servo motor 5 or on a movable unit (not shown) driven by the servo motor, and a current feedback signal from a detector for detecting the current flowing in the servo motor 5.

In this servo controller 3, PWM command (voltage command) is obtained by feedback control of position, speed and current, and the obtained PWM command is issued to a servo amplifier 4. In the servo amplifier 4, the PWM signal is generated, as mentioned above, based on the received PWM command and the triangular wave issued from triangular wave generating means. The servo motor 5 is driven with on/off control of switching elements T1, T2, . . . of the inverter in the servo amplifier based on this PWM signal.

In the present invention, in addition to the above configuration, the numerical controller 1 comprises PWM period change instructing means for issuing mode signal of mode A or mode B to the servo controller 3 through the shared RAM 2. Further, the servo controller 3 comprises PWM period changing means which, receiving this mode signal, changes the servo gain (position loop gain, speed loop gain, current loop gain) corresponding to the received mode (mode A or mode B), issues the command of PWM period to the servo amplifier 4, and causes the triangular wave generating means to generate the frequency corresponding to the PWM period for the commanded mode.

Selection of mode A or mode B is determined by putting the mode command in a program such as NC program and teaching program to be fed into the numerical controller 1. That is, the command of mode B is put in the program at a position where an operation with high control precision such as processing precision and operation precision is instructed while the command of mode A is put in the program at a position where high torque is instructed rather than high control precision. Moreover, the numerical controller 1 comprises PWM period change instructing means for issuing a PWM period changing command based on the mode command which was read out from the program.

Writing designation of mode A or mode B in the program is very simple. But, as a program includes commands concerned with control precision such as cutting feed and fast feed in many cases, even if the designation of mode A or mode B is not written in the program, the PWM period change instructing means of the numerical controller 1 can discriminate between a command requiring a high control precision and a command requiring a high torque, based on the type of the command which was read from the program, with the result that mode A or mode B can be automatically selected and issued accordingly.

For example, it may be set to select the mode based on the type of the move command (or based on the G code in the case of a machine tool), so as to issue mode B allowing a high control precision in case of cutting feed by contour control, or mode A enabling a higher torque to be generated in case of fast feed.

Generally, when rotating a motor at a high speed, a large output torque is required rather than high control precision. Accordingly, the mode can be selected based on the magnitude of the speed command (for example, selecting mode A capable of generating a high torque in the case of speed command higher than a predetermined speed, while issuing mode B if smaller than the predetermined speed).

Generally, when the speed change is large, that is, in case of high acceleration or deceleration, a high torque is required. Accordingly, by comparing the difference of the present speed command and the next speed command, changeover to mode A may be conducted when the difference is more than the predetermined value where the acceleration or deceleration is relatively large, while changeover to mode B may be conducted when the difference is less than the predetermined value.]

On the other hand, the PWM period changing means of the servo controller 3, receiving the mode changeover command, issues a PWM period command for changing over the PWM period to the servo amplifier. Usually, a PWM period is equal to a current control period. However, in this embodiment, a current control period is not changed but only a PWM period is changed.

If a current control period is changed, the effect propagates throughout the entire control system, and hence a control period cannot be changed easily. On the other hand, changing of a PWM period can be realized by changing only the oscillation frequency of the triangular wave generating means, and the desired end (raising a torque generated) is attained only by designing such that two (or three or more, if necessary) levels of frequencies can be selectively generated in the triangular wave generating means in advance. Considering these points, in the embodiment, only a PWM period is changed without changing a current control period. The torque to be generated can be increased only by changing the PWM period.

Figure 6:
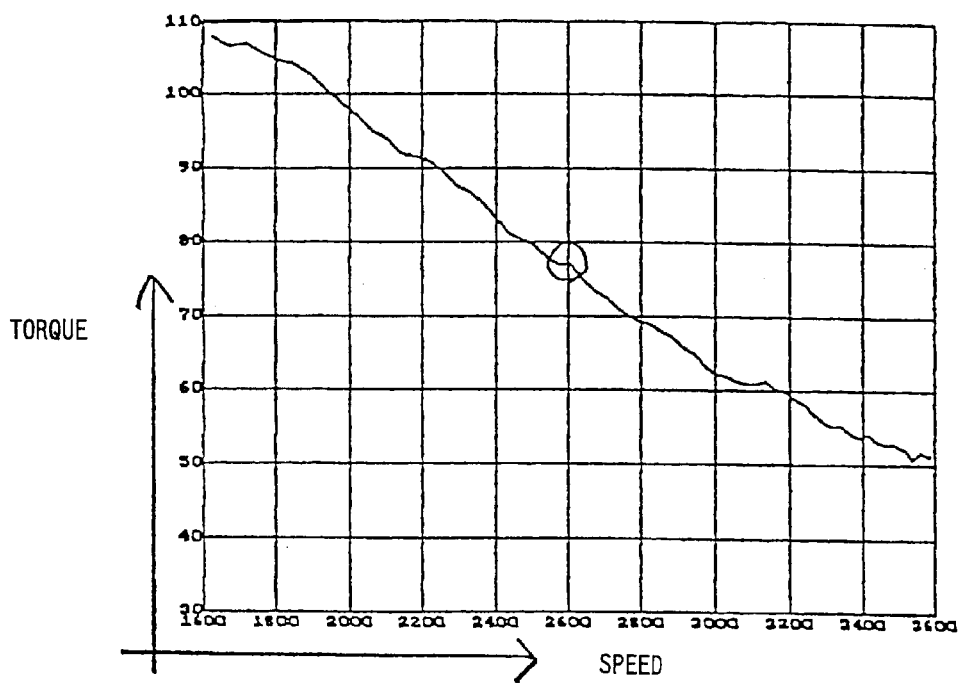
FIG. 6 is a diagram showing results of experiment of measurement of motor output torque when both current control period and PWM period are extended.
Figure 7:
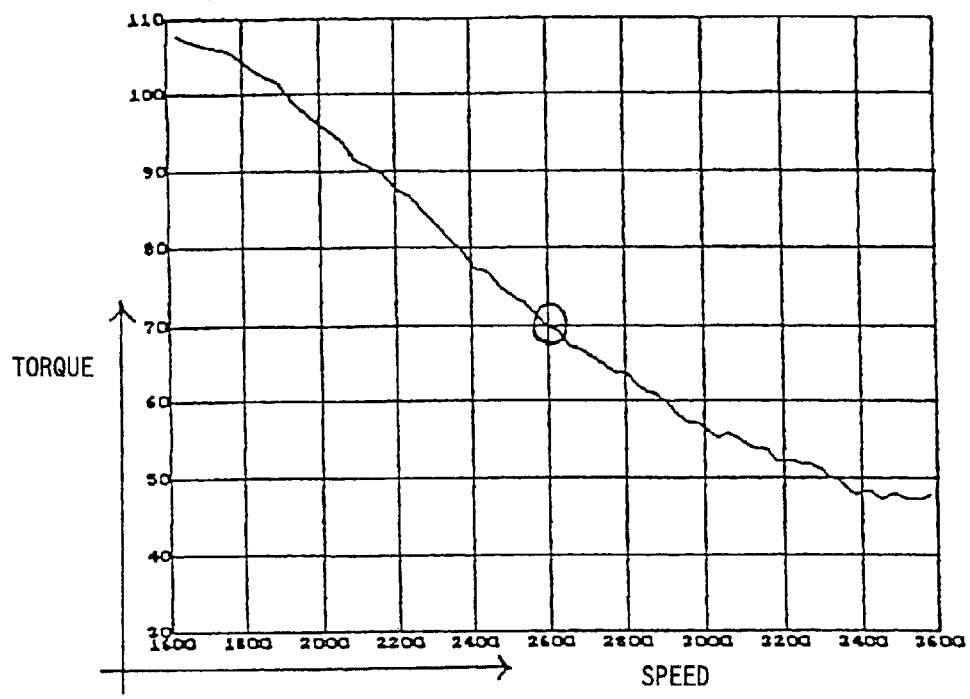
FIG. 7 is a diagram showing results of experiment of measurement of motor output torque when both current control period and PWM period are shortened (to ½ period of FIG. 6).
Figure 8:
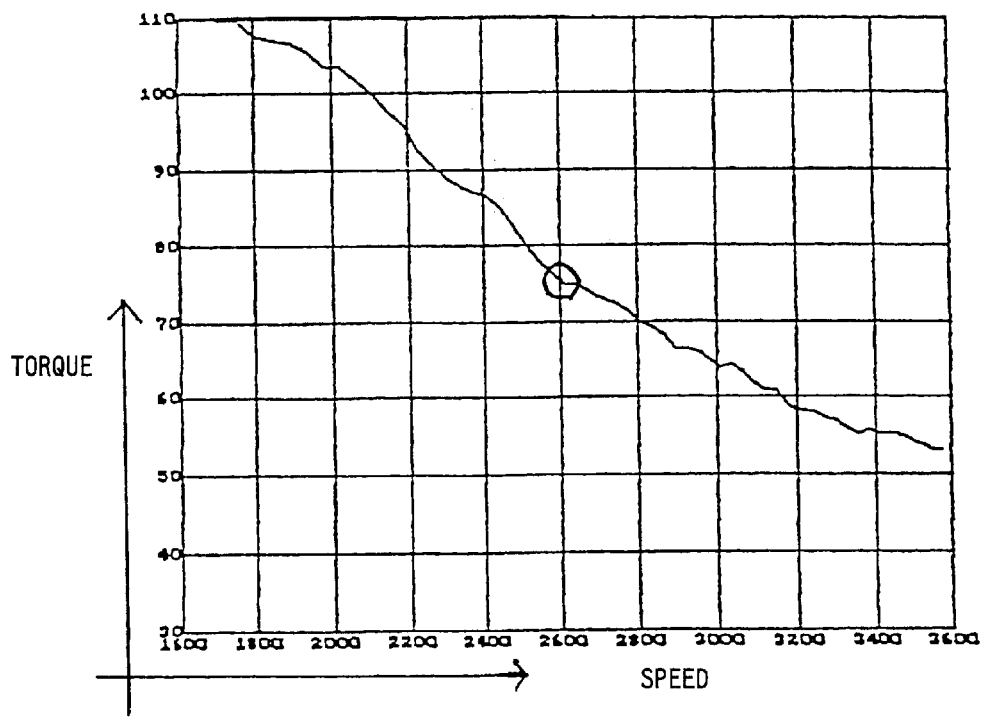
FIG. 8 is a diagram showing the result of measurements of motor output torque when the current control period is same as in FIG. 7 and the PWM period is twice as long as in FIG. 7 (same as in FIG. 6).

Examples of experiment which shows that the magnitude of generated torque for a motor can be changed by changing the PWM period are explained by referring to FIG. 6 to FIG. 8. In these diagrams, the axis of abscissas represents the rotating speed (rpm) of the motor, while the axis of ordinates represents the generated torque.

FIG. 7 shows a torque generated in mode B where high control precision is required. In this case, the PWM period and current control period are identical. On the other hand, FIG. 6 shows a torque generated in mode A where both PWM period and current control period are doubled. Comparing FIG. 6 and FIG. 7, it is known that the generated torque is larger in mode A shown in FIG. 6 than in mode B.

FIG. 8 shows a torque generated in mode A, where the current control period is same as in mode B shown in FIG. 7, but the PWM period is twice that of FIG. 7, that is, same period as in FIG. 6. As clear from the comparison between FIG. 8 and FIG. 7, the generated torque is larger in mode A shown in FIG. 8 than in mode B shown in FIG. 7. Comparing FIG. 8 with FIG. 6 where both PWM period and current control period are doubled, there is no significant difference between the two although the generated torque is slightly lowered in FIG. 8.

Considering the results of experiment in FIG. 6 to FIG. 8, in this embodiment, only the PWM period is changed, and the PWM period is double in mode A as compared with mode B. Further, in the embodiment, as the generated torque of the motor varies depending on the mode, it is designed to change the servo gain depending on the mode change.

Figure 5:
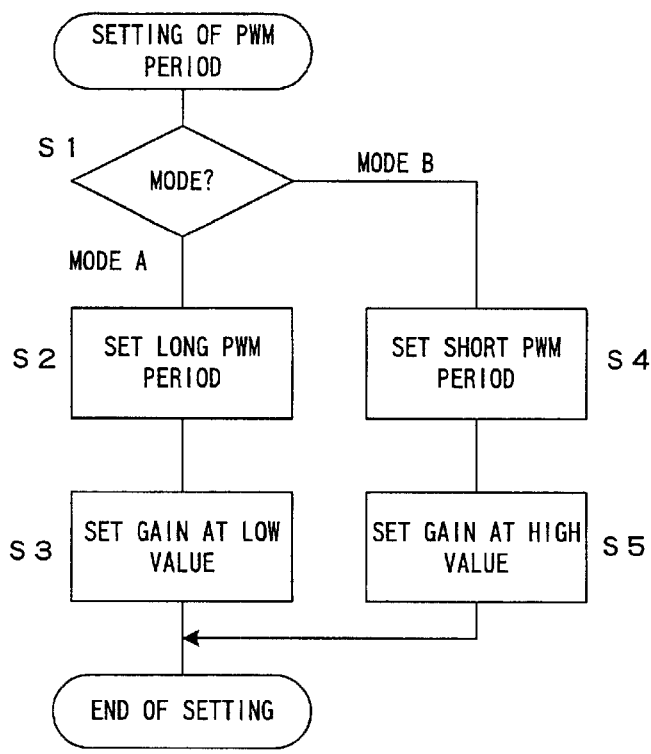
FIG. 5 is a flowchart of PWM period setting process to be executed by the processor of servo controller in the embodiment.

FIG. 5 is a flowchart of processing in which the processor of the servo controller 3 reads the mode change command. The processor for executing this processing serves as PWM period changing means.

First, judging whether the read mode is mode A or mode B (step S1), when mode A is read, an output is issued to cause the triangular wave generating means of the servo amplifier to change the PWM period to a longer period (step S2). The PWM period becomes long, so that the generated torque of the motor is increased, and all or any of the speed loop gain, current loop gain and position loop gain is set to a predetermined low value (step S3).

On the other hand, when mode B is read at step S1, an output is issued to the triangular wave generating means of the servo amplifier to change the PWM period to a shorter period (a half of the period in mode A)(step S4). Further, the PWM period becomes smaller and the generated torque of the motor decreases, so that the servo gain is set to a predetermined higher value. That is, all or any of the speed loop gain, current loop gain and position loop gain is set to a higher value (step S5).

In this way, depending on the mode commanded from the numerical controller 1, the PWM period and servo gain are changed, and in a case where control precision is required, the PWM period is shortened so that error may be corrected quickly, with the result that the high control precision is assured. On the other hand, in a case where high speed, high acceleration or deceleration, or large torque is required, the PWM period is made longer, and the generated torque of the motor is increased.

What is claimed is:

1. A motor control device for a robot, a machine tool or an industrial machine, including an AC motor driven by a PWM method, comprising:

a numerical controller which issues a PWM period changing command based on whether or not a move command indicates a precision movement direction or a high operation; and a servo controller driving and controlling the AC motor by changing a PWM period based on the PWM period changing command.

2. A method of controlling an AC motor used in a robot, a machine tool or an industrial machine, comprising:

generating a movement command;

determining a PWM period based on whether or not a precision movement direction is indicated by the movement command;

controlling the PWM period which is used to drive the AC motor based on the determined PWM period.

3. A motor control device for a robot, a machine tool or an industrial machine, comprising:

a numerical controller issuing a move command; and a servo controller driving and controlling an AC motor by a PWM method based on the move command issued from said numerical controller, wherein said numerical controller includes PWM period change instructing means for instructing change of the PWM period based on whether or not a precision movement direction is indicated by the move command, and wherein said servo controller includes PWM period changing means for changing the PWM period corresponding to the PWM period changing command.

4. The motor control device according to claim 3, wherein said PWM period change instructing means issues the PWM period changing command based on the type of the move command issued by said numerical controller.

5. The motor control device according to claim 3, wherein said PWM period change instructing means issues the PWM period changing command based on the speed of the move command issued by said numerical controller.

6. The motor control device according to claim 3, wherein said PWM period change instructing means issues the PWM period changing command based on the magnitude of change in the speed of the move command issued by said numerical controller.

7. The motor control device according to claim 3, wherein the PWM signal is created by comparison with a triangular wave, and said PWM period changing means changes the PWM period by changing the frequency of the triangular wave.

8. The motor control device according to claim 3, wherein said PWM period changing means changes over the current loop gain, speed loop gain and/or position loop gain in the servo controller, together with the change of the PWM period.

9. The motor control device according to claim 3, wherein said PWM period changing means changes the PWM period without changing the current control period.

10. A control method for an AC servo motor comprising:

comparing a PWM command as a voltage command given to a servo amplifier of the AC servo motor according to a current control period, and a triangular wave generated by triangular wave generating means, and changing over one of first and second switching elements for one phase to ON and another phase to OFF, or one phase to OFF and another phase to ON, based on the result of comparison, providing simultaneous OFF time for both the first and second switching elements by changing the first switching element from OFF to ON after a specified short time when the second switching element is changed from OFF to ON, and changing the second switching element from OFF to ON after a specified short time when the first switching element is changed from OFF to ON, and adjusting the rate of the simultaneous OFF time of the first and second switching elements within a specific operation time, by changing the output period of the PWM command and the period of the triangular wave based on whether the AC servo motor requires high acceleration or deceleration.

* * * * *